United States Patent [19]

Hayes

[11] 3,780,746
[45] Dec. 25, 1973

[54] COMBINATION VANITY TRAY AND MIRROR

[75] Inventor: Thomas H. Hayes, Westport, Conn.
[73] Assignee: VCA Corporation, Greenwich, Conn.
[22] Filed: Apr. 13, 1973
[21] Appl. No.: 350,968

[52] U.S. Cl. .............................................. 132/83 R
[51] Int. Cl. .............................................. A45d 33/00
[58] Field of Search ................ 132/83, 79 R, 79 G; 128/3; 312/226; 248/1, 478, 38, 473, 469

[56] References Cited
UNITED STATES PATENTS
2,459,733   1/1949   Macy .............................. 132/79 C
3,586,274   6/1971   Hart .................................. 248/1

Primary Examiner—Louis G. Mancene
Assistant Examiner—Gregory E. McNeill
Attorney—H. Gibner Lehmann

[57] ABSTRACT

A combination vanity tray and mirror wherein the tray has a socket arranged to receive the mirror handle in either of two sloped positions, extending either forward toward or rearward from the user. The socket, located in a peripheral portion of the tray, can be disposed either close to the user or more remote from the user by turning the tray. For the close position, the mirror handle extends over the tray and for the remote position, the handle extends oppositely, away from the tray. The mirror is double faced, having a planar reflecting surface at one side and a magnifying reflecting surface on its other side. Thus four different combinations are possible, involving the mirror. For a close positioning, the mirror can provide either a true image or else a magnified image, and such images can also be had for the remote position. In connection with the latter, the tray can be extended under the face of the user so as to catch powder and cosmetic particles that drop down during use. For the close-up position of the mirror, the thin mirror handle and disposition of the mirror proper still permit easy access to the tray. When dismantled, the mirror and tray can be nested flat to occupy a small space for storage and shipping.

7 Claims, 6 Drawing Figures

PATENTED DEC 25 1973

PATENTED DEC 25 1973

COMBINATION VANITY TRAY AND MIRROR

BACKGROUND

This invention relates to vanities and cosmetic accessories, and more particularly to a combination vanity tray and mirror. Heretofore it invention, been the common practice for a woman to apply cosmetic products such as make-up while sitting in front of a vanity table having one or several large mirrors to provide the desired reflected images. Additionally, small hand mirrors were utilized to enable special areas of the user to be viewed, and to provide closeups. Reversible mirrors mounted on swivel stands and having true image and magnifying image reflectors have also been proposed and produced. These latter have the advantage of freeing the hands of the user, since the mirror did not require holding. While the foregoing have been in general satisfactory and have found widespread use, certain drawbacks existed. If a user placed a round lipstick casing or cover on the vanity table, it would often roll off. Frequently it fell to the floor, and this constituted an inconvenience and annoyance. Also, the surface of the vanity table would become covered with powder, particles of rouge and other cosmetic substances, and any thorough cleaning of the table required wiping procedures, usually with a damp cloth to completely remove the debris.

SUMMARY

The foregoing drawbacks and disadvantages of prior make-up accessories, vanities and the like are largely obviated by the present inventin, which has for its object the provision of a novel combination vanity tray and mirror which not only constitutes a convenient holding device for the articles of make-up but also furnishes a convenient means of viewing the face either full size or magnified while at the same time freeing both hands for use. A related object of the invention is to provide an improved combination tray and mirror as above set forth, which is especially simple and economical to fabricate, whereby the production cost is low, making possible an attractive retail selling price. These objects are accomplished by the provision of a molded, generally flat plastic tray which is preferably of circular configuration, having in one peripheral portion an upwardly accessible socket, and by the provision of a hand mirror so arranged that the end of the mirror handle is receivable in the socket in either of two positions whereby the mirror can be placed in either a forwardly sloped or backwardly sloped operative position. Also, for either of such sloped positions the handle end is receivable in the socket in two different positions, one 180° rotated from the other, thereby to present either one mirror surface on another for viewing by the user. Around its periphery the tray has an upstanding flange which prevents roll-off of objects placed on the tray, such as small round cases, covers and the like. The mirror can be readily lifted from the tray and used in the manner of a hand mirror when desired. By making the mirror frame and handle of molded plastic construction as well as the tray, the entire assemblage can be quickly and economically fabricated in various attractive finishes.

Other objects of the invention reside in the provision of an improved combination vanity tray and mirror as above described, which is rugged and durable, not easily broken, small and compact, light in weight, and especially convenient in its use.

Still other features and advantages will hereinafter appear.

In the accompanying drawings, illustrating one embodiment of the invention:

Figure 1:
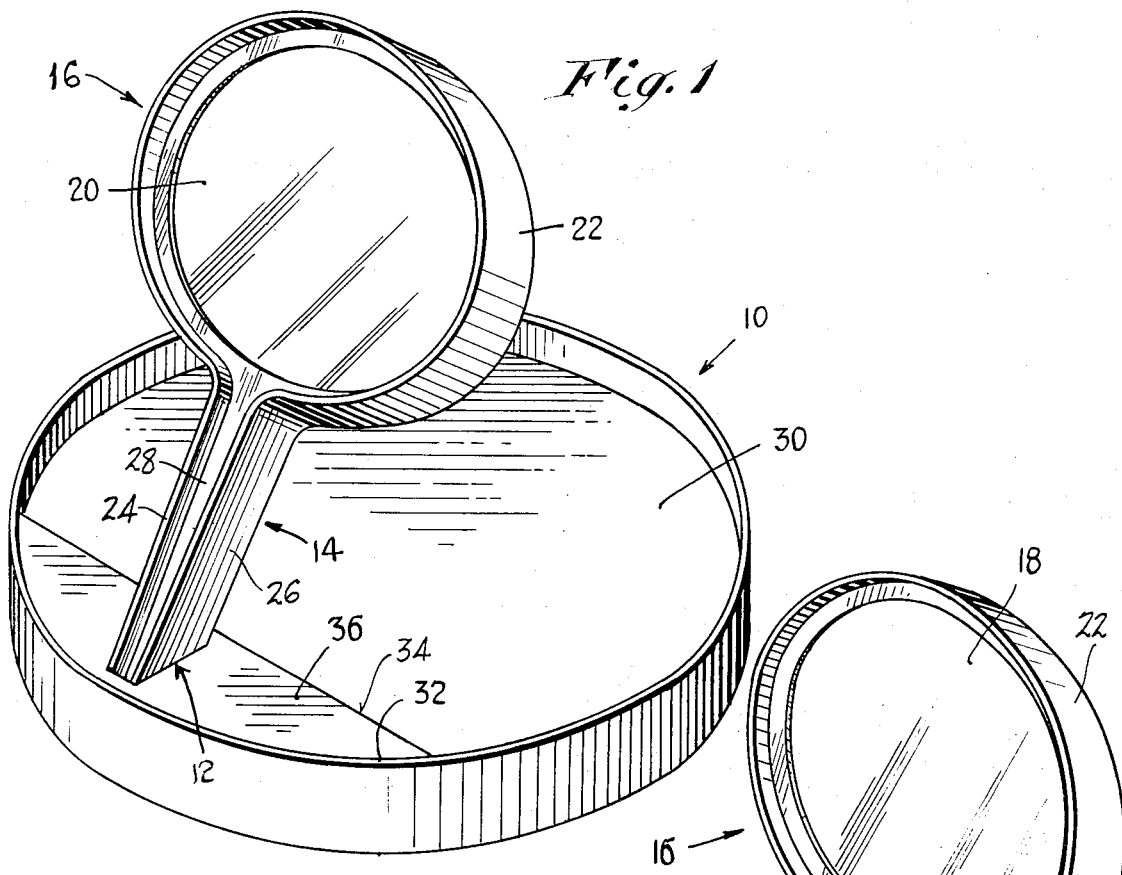
FIG. 1 is a perspective view of the assembled vanity tray and mirror, the latter being disposed close to the user and leaning backward over the tray.
Figure 2:
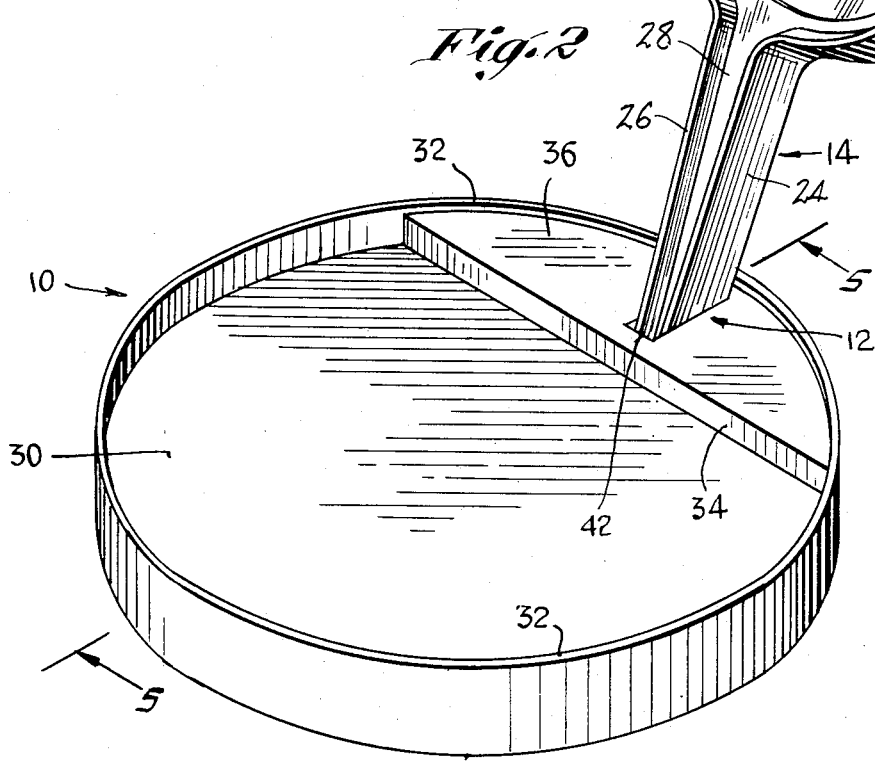
FIG. 2 is a perspective view of the assembled tray and mirror with the latter located more remote from the user and leaning or sloping away from the tray.
Figure 3:
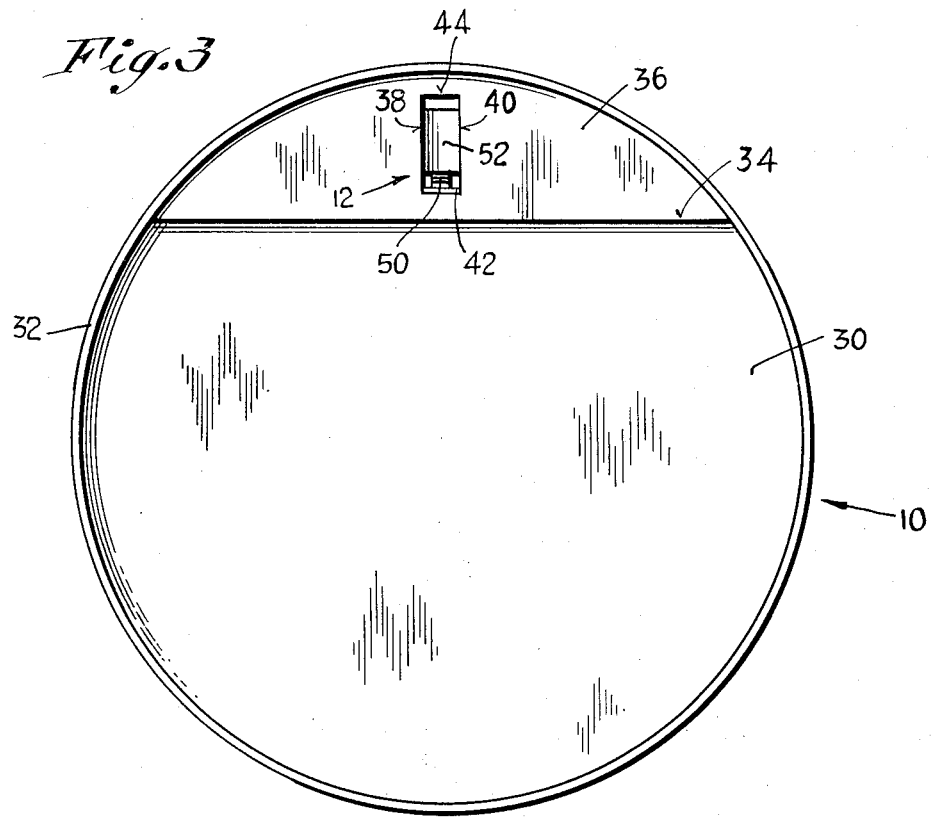
FIG. 3 is a top plan view of the tray per se.

Considering first FIGS. 1-3, the combiantion vanity tray and mirror construction comprises a tray proper which is designated generally by the numeral 10, said tray in accordance with the invention having adjacent a peripheral portion thereof an upwardly accessible socket 12 in which there is receivable the handle portion 14 of a mirror which is designated generally by the numeral 16. The mirror 16 comprises two circular mirror elements disposed back to back, a true-image mirror element 18 revealed in FIG. 2, and a magnifying-image mirror element 20 shown in FIG. 1. The back-to-back mirror elements 18, 20 are mounted in a suitable circular frame 22 which is formed simultaneously with the handle 14, being preferably molded of suitable plastic substance.

Figure 6:
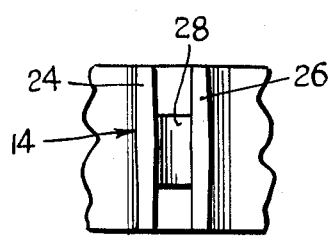
FIG. 6 is an end elevational view of the handle of the mirror.
Figure 4:
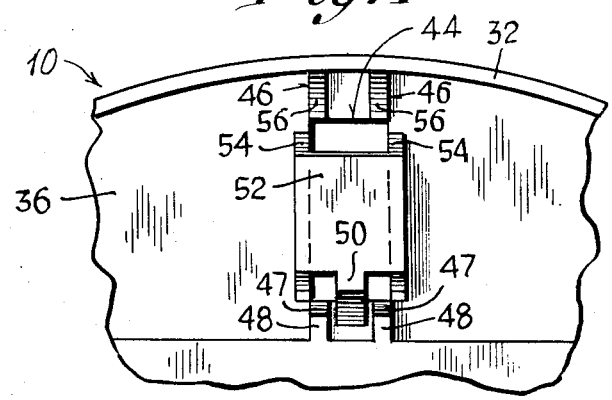
FIG. 4 is a fragmentary bottom plan view of the tray, illustrating the underside of the socket thereof.

As seen in FIG. 6 the handle 14 can be of generally rectangular cross section, and can be formed of a pair of spaced-apart parallel strip members 24, 26 connected to each other by an intermediary web portion 28. The resultant structure is essentially in the form of a deep channel having a cross-sectional configuration like the letter H.

The tray 10 is also preferably molded of plastic substance, having a large, mostly circular supporting surface 30 which is bounded by a circular flange 32 and by a straight shoulder 34 the latter extending across the tray somewhat like the chord of a circle. As made possible by the shoulder 34, the tray has a raised surface 36 which is higher than the supporting or table surface 30, said higher surface 36 being in part bounded by the circular flange 32 and in part defined by the shoulder surface 34.

Disposed in the tray 10 adjacent its periphery, and located in the higher surface 36 thereof is the socket 12 which is of rectangular configuration, said socket having guiding side surfaces 38, 40 and end surfaces 42, 44. The end surface or edge 44 is joined to the flange 32 by a pair of triangular-shaped webs or fillets 46 which constitute an abutment means or surface 56 for the bottom end of the mirror handle when the latter is in the tilted position of FIG. 1 as will be later further explained.

Figure 5:
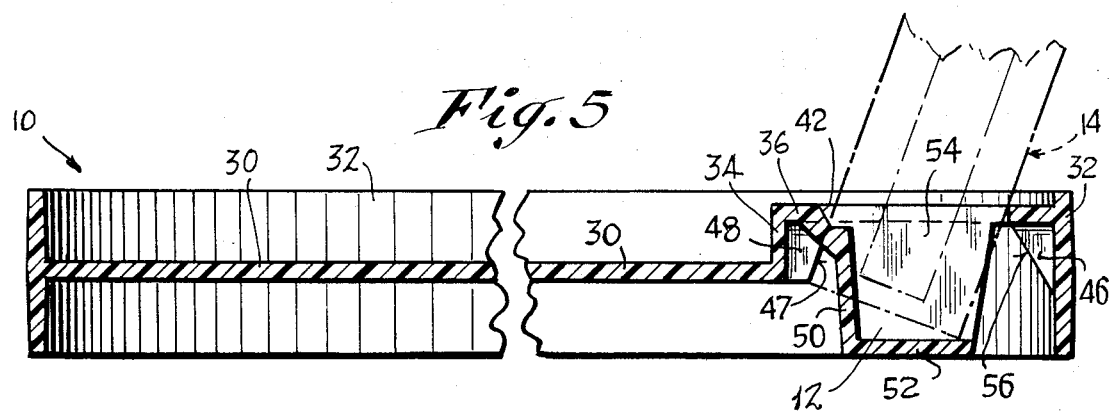
FIG. 5 is a transverse or vertical section through the tray, taken on the line 5—5 of FIG. 2.

Adjoining the socket 12 the tray 10 is provided with lugs 48 which constitute another abutment means 47 engageable with the lower end of the handle 14, this being illustrated in FIG. 5 where the handle is shown in broken outline. For such position of the handle 14, the end edge 44 of the socket 12 acts as an abutment, thereby to position the handle in the sloped setting shown. In the socket 12 there is provided a sloping rib 50 which joins the tray top 36 to a bottom wall portion 52 of the socket, said wall portion being joined to side wall portions 54 also connected to the top 36 as shown. The rib 50 is adapted to be accommodated in the space between the side strips 24, 26 of the handle 14 for the mirror position illustrated in FIG. 5.

If the mirror should be tilted to the opposite sloped position such as that shown in FIG. 1, the edges of the side strips 24, 26 of the mirror handle 14 will engage another abutment means, specifically the webs 46 which have abutment surfaces 56, and the end edge 42 of the socket. With such engagement, the mirror 16 will be disposed over the tray 10.

It will be understood from the figures that the handle 14 of the mirror 16 can be inserted in the socket 12 in either of two positions, 180° rotated one with respect to the other. With the mirror inserted in one position, the magnifying mirror element 20 will be presented to the user, whereas with the mirror inserted in the other position the true-image mirror element 18 will be presented for viewing. The assemblage of FIG. 1 is especially adapted for use with the mirror presenting the magnifying element 20, since the user's face can be brought as close to the mirror as is required to obtain a clear image with magnification. On the other hand, with the mirror presenting its true-image surface 18 to the user, either of the mirror positions of FIGS. 1 and 2 can be utilized effectively. In either circumstance, the supporting surface 30 of the tray 10 can be used to hold the cosmetic articles, such as face powder, lipstick, rouge, eye make-up and the like. The peripheral flange 32 will prevent such objects from rolling out of the tray, and the tray will also catch any debris which ensues from the use of the use of the cosmetics. With the mirror 16 mounted on the tray, the user's hands are completely free for manipulation of the cosmetic materials. In FIG. 1, the thin handle 14 and the disposition of the mirror 16 still permit the user to have easy access to the tray 10. After use, the combination tray and mirror can be quickly dismantled and easily cleaned, as by washing, wiping, etc. The size of the mirror 16 and length of the handle 14 thereof enable the mirror to be nested in the tray, on the tray surface 30 whereby there is had a compact assemblage suitable for storage, shipping, etc.

It will now be seen from the foregoing that I have provided a unique combination of cosmetic tray or vanity tray and mirror which provides added convenience to the user, and which represents a distinct advantage and improvement in the use of cosmetic products. By virtue of the parts being molded of plastic substance, the entire assemblage can be economically fabricated and made with attractive, smooth and easily cleaned finishes.

Variations and modifications are possible without departing from the spirit of the invention.

I claim:
1. A vanity tray and mirror assemblage comprising, in combination:
   a. a flat tray having a socket adjoining a peripheral portion thereof, said socket including a mouth and a pair of abutment edges disposed at opposite sides of the mouth.
   b. a mirror having an elongate handle the end of which is adapted to be received in the socket of the tray, said handle being receivable in said socket in either an inclined, forward extending position or an inclined rearward extending position whereby it engages respectively either one or the other of said abutment edges, and
   c. a pair of abutments disposed deep in said socket, respectively engageable with the handle end when the latter is in either the forward extending or rearward extending position, thereby to support the handle in said positions.
2. A tray-mirror assemblage as in claim 1, wherein:
   a. the said peripheral portion of the tray comprises a surface which is raised with respect to the major tray surface whereby the mouth of the socket is elevated above said major surface.
3. A tray-mirror assemblage as in claim 1, wherein:
   a. the socket is of rectangular configuration and has spaced-apart opposite side walls and a bottom wall connected to the side walls.
   b. said socket having a pair of opposite open sides extending between its side walls, into either of which the end of the mirror handle is received depending on the position of the mirror.
4. A tray-mirror assemblage as in claim 3 and further including:
   a. a rib extending across one of the open sides of the socket and connecting the bottom wall thereof to the tray wall.
5. A tray-mirror assemblage as in claim 4 wherein:
   a. the mirror handle is of channel-like cross section, including spaced-apart flanges,
   b. said rib being receivable in the space between the flanges for one position of the handle,
6. A tray-mirror assemblage as in claim 1 wherein:
   a. the deep abutments in the socket respectively comprise pairs of ribs extending downward from the tray wall adjacent the open sides of the socket.
7. A tray-mirror assemblage as in claim 5 wherein:
   a. the said peripheral portion of the tray comprises a surface which is raised with respect to the major tray surface whereby the mouth of the socket is elevated above said major surface,
   b. said tray being formed with a shallow recess below and bounded in part by said peripheral portion,
   c. said deep abutments, rib, socket side walls and open sides being located at least in part in said shallow recess.

* * * * *